US011118500B2

(12) United States Patent
Karstadt et al.

(10) Patent No.: US 11,118,500 B2
(45) Date of Patent: Sep. 14, 2021

(54) TURBINE WITH ADJUSTING RING (71) Applicant: BorgWarner Inc., Auburn Hills, MI (US)

(72) Inventors: Sascha Karstadt, Undenheim (DE); Mathias Kosch, Mainz (DE); Gerd Spinner, Alzey (DE); Stefan Decker, Bodenheim (DE); Ahmet Coksen, Mannheim (DE); Jamison Taylor, Lambrecht (DE); Laszlo Medvegy, Bingen (DE); Stefan Muenz, Ludwigshafen (DE)

(73) Assignee: BorgWarner Inc., Auburn Hills, MI (US)

( * ) Notice: Subject to any disclaimer, the term of this patent is extended or adjusted under 35 U.S.C. 154(b) by 182 days.

(21) Appl. No.: 16/366,159

(22) Filed: Mar. 27, 2019

(65) Prior Publication Data
US 2019/0301357 A1    Oct. 3, 2019

(30) Foreign Application Priority Data

Mar. 27, 2018 (DE) .......................... 202018101699.7

(51) Int. Cl.
*F02B 37/22* (2006.01)
*F01D 17/14* (2006.01)
*F02C 6/12* (2006.01)

(52) U.S. Cl.
CPC ............ *F02B 37/22* (2013.01); *F01D 17/143* (2013.01); *F01D 17/146* (2013.01); *F02C 6/12* (2013.01);
(Continued)

(58) Field of Classification Search
CPC ........ F02B 37/22; F02B 37/24; F01D 17/141; F01D 17/143; F01D 17/146; F04D 15/0038; F04D 27/0246
See application file for complete search history.

(56) References Cited

U.S. PATENT DOCUMENTS 9,447,723 B2    9/2016 Hirth et al.
9,982,539 B2 *  5/2018 Eckert ...................... F01D 1/08
(Continued)

FOREIGN PATENT DOCUMENTS

DE    102008000848 A1    10/2009
DE    112014005008 T5     7/2016
(Continued)

OTHER PUBLICATIONS

English language abstract and machine-assisted English translation for DE 10 2008 000 848 extracted from espacenet.com database on Apr. 29, 2019, 14 pages.
(Continued)

*Primary Examiner* — Richard A Edgar
*Assistant Examiner* — Jackson N Gillenwaters
(74) *Attorney, Agent, or Firm* — Howard & Howard Attorneys PLLC (57) ABSTRACT The invention relates to a turbine comprising a turbine housing defining a volute having a substantially annular outlet opening, a turbine wheel, and an adjusting ring, rotatable about the turbine axis, which is arranged in the turbine housing radially between the volute and the turbine wheel, wherein the adjusting ring comprises a flow channel between a radially outer first peripheral opening and a radially inner second peripheral opening, and wherein the outlet opening is fluidically coupled to the turbine wheel by the flow channel. The outlet opening and the first peripheral opening have a path, variable in the axial direction, so that during a rotation of the adjusting ring, the outlet opening and the first peripheral opening are adjusted relative to each other in such a way that an overflow cross section between the outlet opening and the first peripheral opening is variably changeable.

15 Claims, 7 Drawing Sheets (52) U.S. Cl.
CPC ...... *F05B 2220/40* (2013.01); *F05D 2220/40* (2013.01); *F05D 2250/41* (2013.01)

(56) References Cited

U.S. PATENT DOCUMENTS

| | | | |
|---|---|---|---|
| 10,240,478 B2 | 3/2019 | Mart | |
| 10,724,434 B2* | 7/2020 | Sumser | ............... F02C 6/12 |
| 2013/0330178 A1* | 12/2013 | Hirth | ............... F01D 17/14 |
| | | | 415/148 |
| 2015/0093236 A1* | 4/2015 | Faeth | ............... F01D 17/14 |
| | | | 415/148 |
| 2016/0265425 A1* | 9/2016 | Mart | ............ F04D 29/4206 |

FOREIGN PATENT DOCUMENTS

| | | |
|---|---|---|
| EP | 3054121 A1 | 8/2016 |
| WO | 2010020322 A1 | 2/2010 |
| WO | 2011067259 A1 | 6/2011 |

OTHER PUBLICATIONS

English language abstract for DE 11 2014 005 008 extracted from espacenet.com database on Apr. 29, 2019, 2 pages.

English language abstract for WO 2010/020322 extracted from espacenet.com database on Apr. 29, 2019, 2 pages.

English language abstract and machine-assisted English translation for WO 2011/067259 extracted from espacenet.com database on Mar. 16, 2020, 6 pages.

* cited by examiner

TURBINE WITH ADJUSTING RING

CROSS-REFERENCE TO RELATED APPLICATIONS

This application claims the benefit of German Patent Application No. 202018101699.7 filed Mar. 27, 2018, the disclosure of which is herein incorporated by reference in its entirety.

TECHNICAL FIELD

The present invention relates to a turbine with a rotatable adjusting ring for variable changing of the overflow cross section, and also an exhaust gas turbocharger with this type of turbine.

BACKGROUND

Increasingly more vehicles of the more recent generation are equipped with charging devices in order to achieve target demands and satisfy legal requirements. In the development of charging devices, it is imperative to optimize the individual components as well as the system as a whole with respect to their reliability and efficiency.

Known exhaust gas turbocharger have a turbine with a turbine wheel which is driven by the exhaust gas flow of the internal combustion engine. A compressor with a compressor wheel, which is arranged with a turbine wheel on a mutual shaft, compresses the fresh air taken in for the engine. By this means, the amount of air or oxygen available to the engine for combustion, is increased. This in turn leads to a performance improvement of the internal combustion engine.

In the prior art, turbines particularly with a variable turbine geometry (VTG) are known, in particular in order to increase the power output of the turbine stage at lower engine speeds. In this context, rotatably mounted guide vanes are often used in order to be able to variably change the passage cross section from the volute to the turbine wheel. By this means, the flow cross section of the exhaust gas between the volute and the inlet to the turbine wheel, and thus the exhaust gas speed or the inflow velocity may be changed at the turbine wheel.

The object of the present invention is to provide and alternative VTG turbine or exhaust gas turbocharger with improved efficiency.

BRIEF SUMMARY OF THE INVENTION

The present invention relates to a turbine with a rotatable adjusting ring for variable changing of the overflow cross, and also an exhaust gas turbocharger with this type of turbine.

The turbine according to the invention comprises a turbine housing, a turbine wheel, and a rotatable adjusting ring. The turbine housing defines a volute with a substantially annular outlet opening. The adjusting ring is rotatable about the turbine axis and is arranged in the turbine housing radially between the volute and the turbine wheel. The adjusting ring comprises a flow channel between a radially outer first peripheral opening and a radially inner second peripheral opening. The outlet opening is fluidically coupled to the turbine wheel by the flow channel. The outlet opening and the first peripheral opening have a path which is variable in the axial direction, so that during a rotation of the adjusting ring, the outlet opening and the first peripheral opening are adjusted relative to each other in such a way that an overflow cross section between the outlet opening and the first peripheral opening is variably changeable. Due to a variable change of the overflow cross section, the flow speed of a fluid flowing from the volute through the adjusting ring to the turbine wheel may be variably changed. By this means, the flow speed may be adjusted to different operating states of the turbine. For example, during operation of the turbine at low engine speeds, the flow speed of a fluid may be increased by a reduction of the overflow cross section. In sum, a turbine with variable output may thus be provided which is flexibly adaptable to different operating states.

In embodiments which are combinable with the preceding embodiment, the adjusting ring may be continuously adjustable by rotation between a first position and a second position. The overflow cross section is thereby maximal in the first position and minimal in the second position. Alternatively or additionally, the adjusting ring may be rotated by an angle phi between the first position and the second position. The angle phi may assume a value between 0° and 360°. In the first position, the angle phi may have a value of 0°. A maximal value of the angle phi may be limited by the second position. The angle phi preferably assumes a maximum value between 90° and 270°, and particularly preferably a value of 180°. In some embodiments, the maximum value of angle phi may, however, also have a maximum value lower than 90° or a maximum value greater than 270°. An over rotation past the second position may be prevented by a limiting device, for example, a limiting element. Due to the continuous adjustment, overflow cross sections between the maximum and minimum overflow cross section may be realized. Thus, a more flexible turbine may be provided which may be efficiently adjusted to different operating states.

In embodiments, which are combinable with any one of the preceding embodiments, the adjusting ring may comprise a plurality of guide vanes which are arranged in the flow channel. The guide vanes may thereby be arranged in the flow channel at a fixed guide angle. Due to the fixed guide vanes, incidence losses may be reduced as the turbine wheel is always flowed over at a fixed angle of incidence. The efficiency of the turbine may be increased by this means. Alternatively, the guide angle of the guide vanes may be variable. Alternatively or additionally, the plurality of guide vanes may comprise a substitute blade and a plurality of truncated guide vanes. The substitute blade thereby extends in the radial direction up to a radially outer lateral face of the adjusting ring. The truncated guide vanes are thereby spaced radially apart from a radially outer lateral face. An incident flow on the turbine wheel may be improved by this means. A flow in the flow channel, which flows in the circumferential direction, may be deflected radially inward or radially outward by the substitute blade. A continuing flow of the flow in the circumferential direction may thus be prevented. In contrast, a fluid flow in the circumferential direction may be facilitated by the truncated guide vanes, at least in a region radially outside of the truncated guide vanes. Due to this interplay between substitute blade and truncated guide vanes, a flow inside of the flow channel in the circumferential direction may be controlled relative to the adjusting ring.

In embodiments, in which the adjusting ring is continuously adjustable by rotation between a first position and a second position, and which are combinable with the preceding embodiment, the substitute blade may be arranged in the flow channel in such a way that a radially outer region of the substitute blade connects to a radially inner wall of a volute inlet, when the adjusting ring is located in the first position. Due to this particularly advantageous embodiment, essential fluid amounts may be prevented from flowing into the adjusting ring in a circumferential direction directed opposite a flow direction along the periphery as determined by the volute geometry.

In embodiments, which are combinable with any one of the preceding embodiments, the first peripheral opening may be designed in a radially outer lateral face of the adjusting ring. Alternatively or additionally, the second peripheral opening may be designed in a radially inner lateral face of the adjusting ring.

In embodiments, which are combinable with any one of the preceding embodiments, the flow channel may extend from the first peripheral opening to the second peripheral opening.

In embodiments, which are combinable with any one of the preceding embodiments, the second peripheral opening may have a constant axial height along the periphery. Alternatively or additionally, the second peripheral opening may be arranged on a radially inner lateral face at a position axially constant with respect to the turbine axis.

In embodiments, which are combinable with any one of the preceding embodiments, the first peripheral opening may extend axially between a first surface line and a second surface line of a radially outer lateral face of the adjusting ring, wherein the first surface line and the second surface line extend substantially along the entire periphery. Alternatively or additionally, the outlet opening may extend axially between a first contour line and a second contour line of the volute, wherein the first contour line and the second contour line extend substantially along the entire periphery. In addition, the surface lines and the contour lines may each comprise an axial starting position and an axial end position. The respective starting positions are thereby connected to the respective end positions via a curve section, in particular, a constant curve section, extending along the periphery. Alternatively or additionally, an axial spacing between the two surface lines may be substantially constant in the circumferential direction, and an axial spacing between the two contour lines may be variable in the circumferential direction in such a way that, during a rotation of the adjusting ring, the peripheral opening is adjusted in relation to the outlet opening in order to variably change the overflow cross section. Alternatively, the axial spacing between the two contour lines may be substantially constant in the circumferential direction, and an axial spacing between the two surface lines may be variable in the circumferential direction in such a way that, during a rotation of the adjusting ring, the peripheral opening is adjusted in relation to the outlet opening in order to variably change the overflow cross section.

In embodiments which are combinable with the preceding embodiment, the axial starting positions and the axial end positions respectively depict axial maximums and axial minimums of the surface lines or the contour lines. Alternatively or additionally, the curve sections may extend essentially 360° along the periphery, such that the surface lines and the contour lines each have, between the two different axial positions, a discontinuous region in which surface lines and contour lines have a jump in the axial direction.

In embodiments, which are combinable with any one of the preceding embodiments, an axial height of the flow channel may be constant in a radial path from the first peripheral opening to the second peripheral opening. Alternatively, the axial height of the flow channel may be variable in a radial path from the first peripheral opening to the second peripheral opening. Alternatively or additionally, the axial height of the flow channel may be constant along the periphery. Alternatively, the axial height of the flow channel may be variable along the periphery.

In embodiments, which are combinable with any one of the preceding embodiments, the second peripheral opening may extend axially between a first surface line and a second surface line of a radially inner lateral face of the adjusting ring, wherein the first surface line and the second surface line extend substantially along the entire periphery.

In embodiments, which have surface lines and contour lines, and which are combinable with the preceding embodiment, the flow channel may be formed between a first channel surface, which extends between the two first surface lines, and a second channel surface, which extends between the two second surface lines.

In embodiments which are combinable with the preceding embodiment, the first channel surface may extend straight between the two first surface lines and the second channel surface may extend straight between the two second surface lines. Alternatively, the first channel surface may extend between the two first surface lines and/or the second channel surface may extend between the two second surface lines in a shape that is not straight, in particular in the shape of a curve, an arc, L-shaped or swinging.

In embodiments which are combinable with the preceding embodiment, the volute may be inclined axially in such a way that, in the first position of the adjusting ring, a flow channel of the volute is aligned flush with the flow channel. Flow losses may be reduced by this means. Furthermore, the turbine housing may likewise be axially inclined by this means. The turbine housing may thus be separated in the region of the volute farther from a bearing housing of an exhaust gas turbocharger, which comprises a turbine according to the invention, than a non-axially inclined turbine housing. The turbine and the bearing housing may be better thermally decoupled by this means.

The invention additionally relates to an exhaust gas turbocharger. The exhaust gas turbocharger comprises a compressor and a turbine, wherein the compressor and the turbine are mounted on a mutual shaft and are torsionally coupled to each other. The turbine is thereby a turbine according to any one of the preceding embodiments.

In embodiments which are combinable with the preceding embodiment, the exhaust gas turbocharger may additionally comprise a bearing housing. The bearing housing is arranged axially between the compressor and the turbine. The turbine housing may thereby be inclined axially away from the bearing housing in the region of the volute.

DETAILED DESCRIPTION

Embodiments of turbine 1 according to the invention will subsequently be described based on the figures.

Figure 1A:
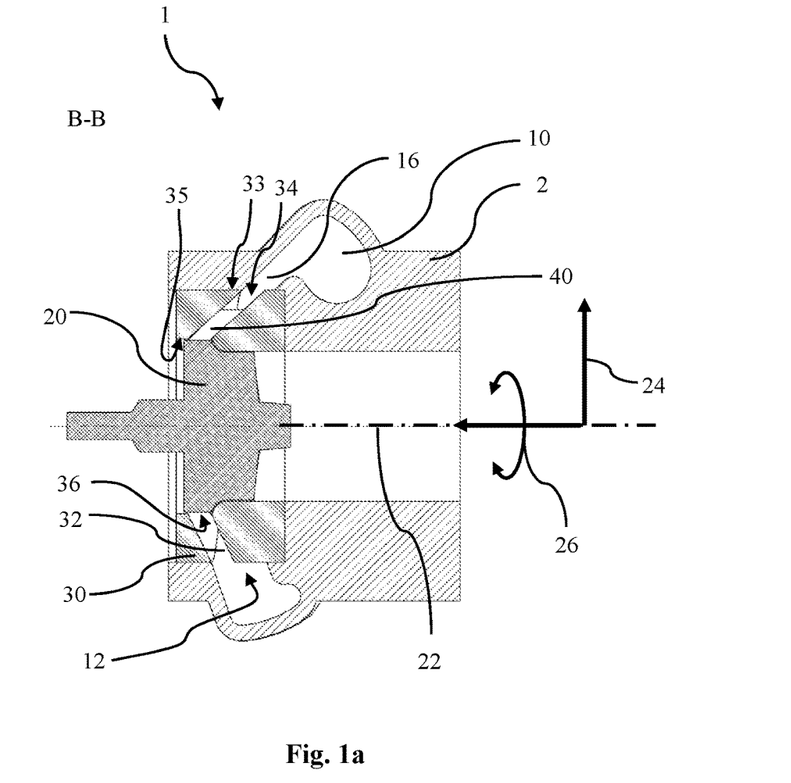
FIGS. 1a-1b show two views of the turbine according to the invention with the rotatable adjusting ring in a first position.
Figure 1B:
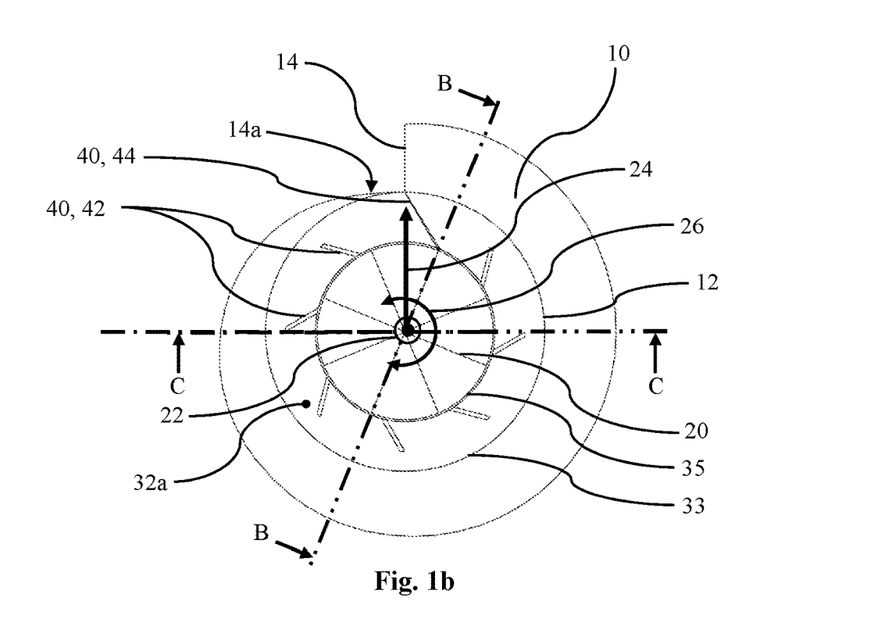

FIGS. 1a-1b show a turbine 1 according to the invention. FIG. 1a thereby shows a sectional side view of turbine 1 according to section line B-B, as depicted in FIG. 1b. Turbine 1 comprises a turbine housing 2, a turbine wheel 20, and a rotatable adjusting ring 30. Turbine housing 2 defines a volute 10 with a substantially annular outlet opening 12. Adjusting ring 30 is rotatably mounted about turbine axis 22. Furthermore, it is clear that adjusting ring 30 is arranged in turbine housing 2 radially between volute 10 and turbine wheel 20. Adjusting ring 30 comprises a flow channel 32, which extends between a radially outer first peripheral opening 34 and a radially inner second peripheral opening 36. In other words, this means that flow channel 32 penetrates adjusting ring 30 in radial direction 24. Outlet opening 12 is fluidically coupled to turbine wheel 20 by flow channel 32. Outlet opening 12 and first peripheral opening 34 have a path, variable in axial direction 22, such that during a rotation of adjusting ring 30, outlet opening 12 and first peripheral opening 34 are adjusted relative to each other in such a way that an overflow cross section 15 between outlet opening 12 and first peripheral opening 34 is variably changeable. This means that first peripheral opening 34 may be covered in a flow-obstructing way with respect to outlet opening 12. A reversed covering would also be conceivable. Due to a variable change of overflow cross section 15, the throughput behavior of a fluid flowing from volute 10 through adjusting ring 30 to turbine wheel 20 may be variably changed. By this means, the throughput behavior may be adjusted to different operating states of turbine 1. For example, during operation of turbine 1 at low engine speeds, the output of the turbine may be increased by a reduction of overflow cross section 15. In sum, a more powerful turbine 1 may thus be provided which is flexibly adaptable to different operating states.

Figure 7A:
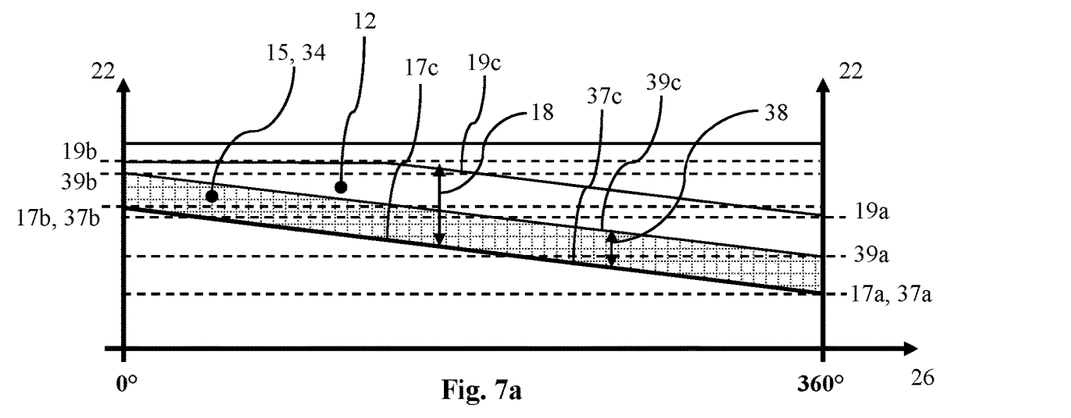
FIGS. 7a-7c schematically show the flattened surface lines and contour lines and the overflow cross section resulting therefrom for the three different positions of the adjusting ring from FIGS. 1a-3b.
Figure 7B:
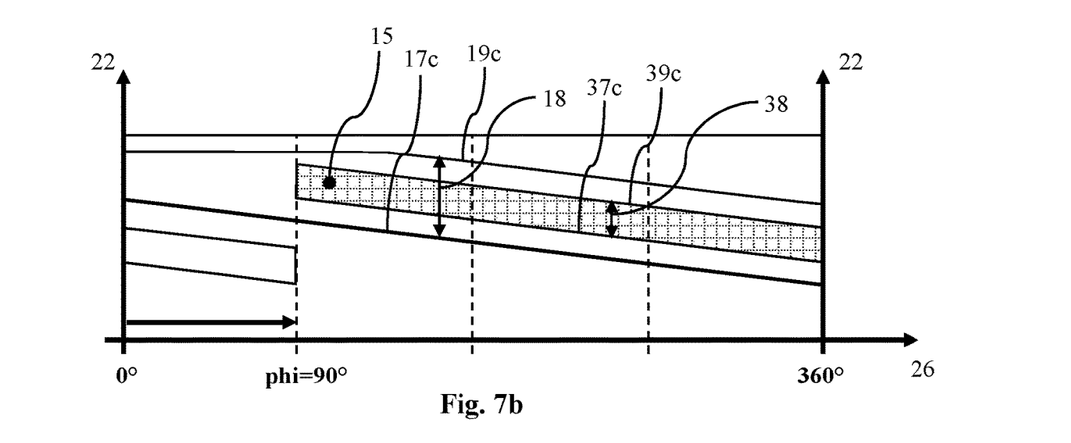
Figure 7C:
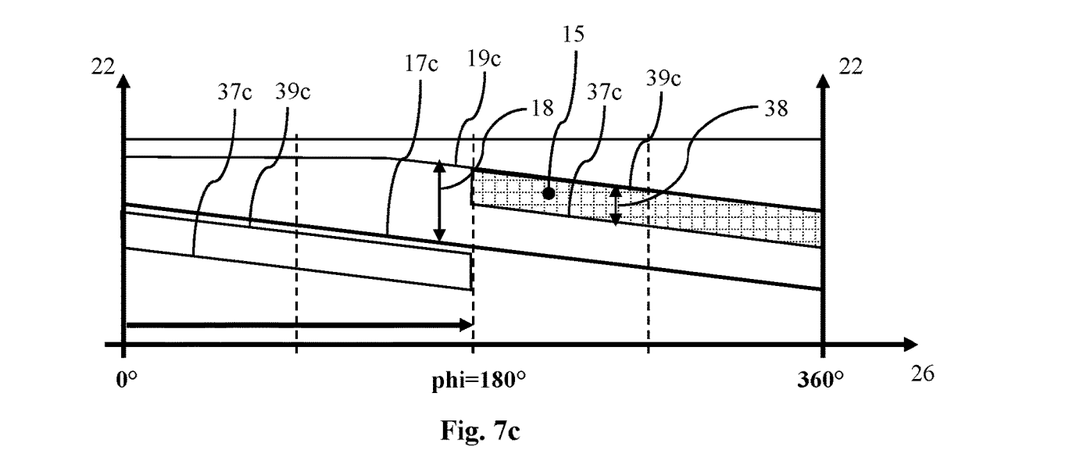

Reference is made to FIGS. 7a-7c, which are explained at a later point, with regard to the path of outlet opening 12 and of first peripheral opening 34, changeable in axial direction 22, and overflow cross section 15 associated therewith.

The terms axial, axial directions relate in general to the axis of turbine 1 or to the axis of adjusting ring 30, and are described with reference numeral 22. The terms radial and radial direction 24 and also circumference and circumferential direction 26 also fundamentally relate to this axis 22. These dimensions are not depicted in all figures for the sake of clarity.

"Substantially annular", for example, regarding outlet opening 12, basically relates to a ring shape, which may, however, be interrupted, for example, at a point in circumferential direction 26 (sickle shaped) or may be interrupted at a point in axial direction 22 (similar to a helical spring section). This is clear, among other things, from FIG. 1b, which shows a schematic top view, in which flow channel 32 and volute 10 are exposed and also radially inner turbine wheel 20 is depicted. It is clear here, that outlet opening 12 has an annular shape in this view. In the view from FIG. 6 discussed later in detail; however, it is clear that outlet opening 12 is interrupted in axial direction 22 or has a path along periphery 26 which is axially changeable. This applies analogously for flow channel 32, which may also be viewed as substantially annular.

Figure 2A:
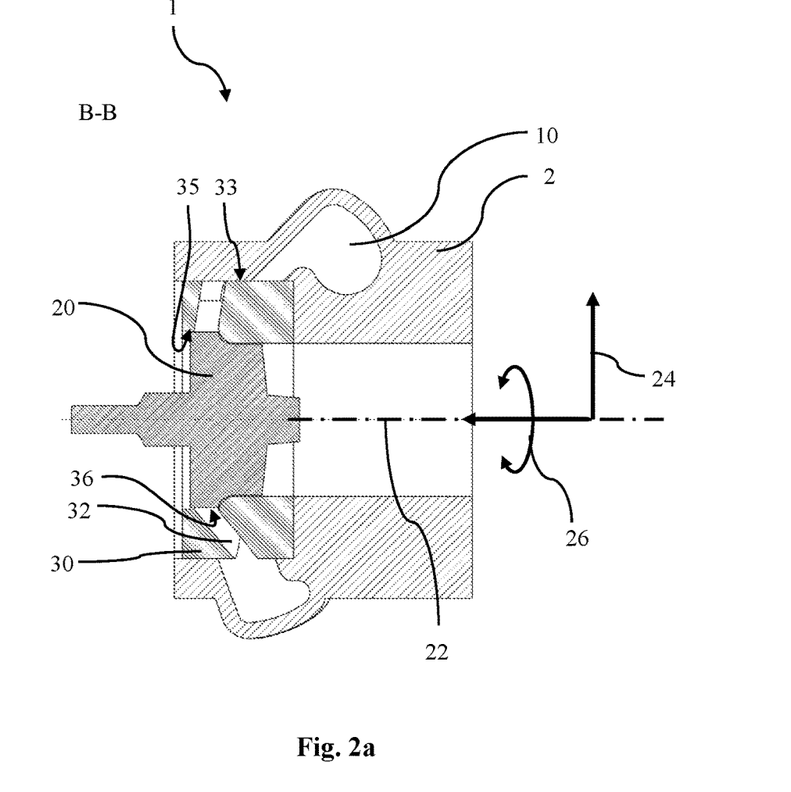
FIGS. 2a-2b show two views of the turbine according to the invention with the rotatable adjusting ring in an intermediate position between the first and second positions.
Figure 2B:
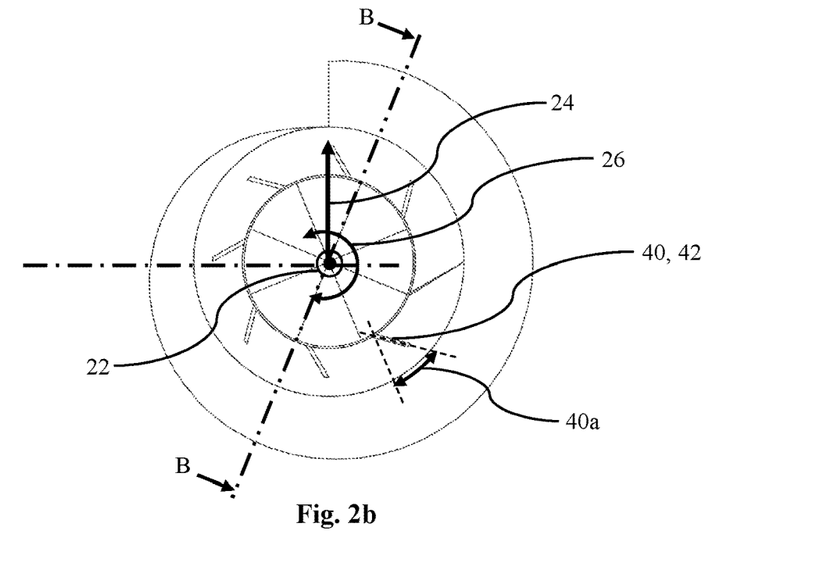
Figure 3A:
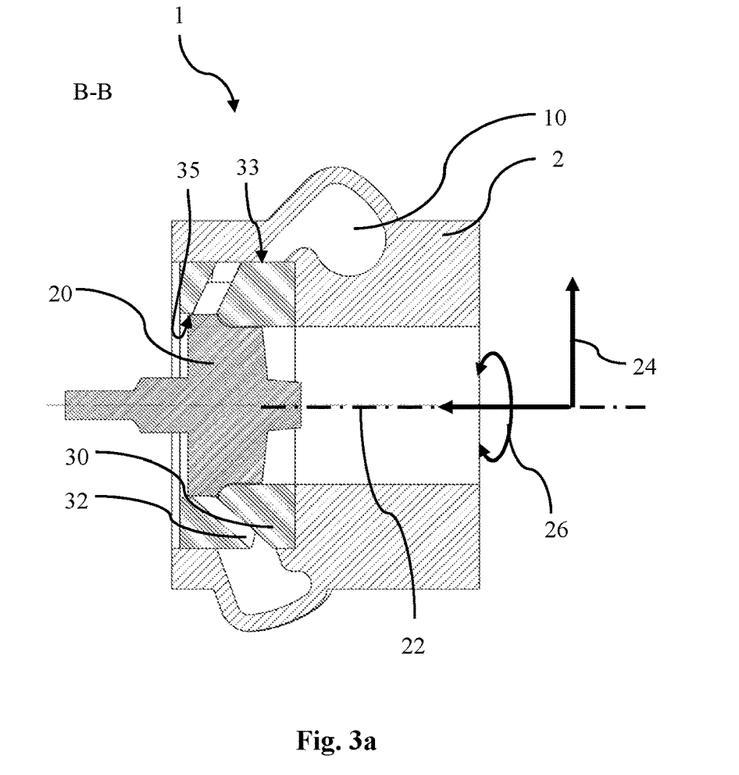
FIGS. 3a-3b show two views of the turbine according to the invention with the rotatable adjusting ring in a second position.
Figure 3B:
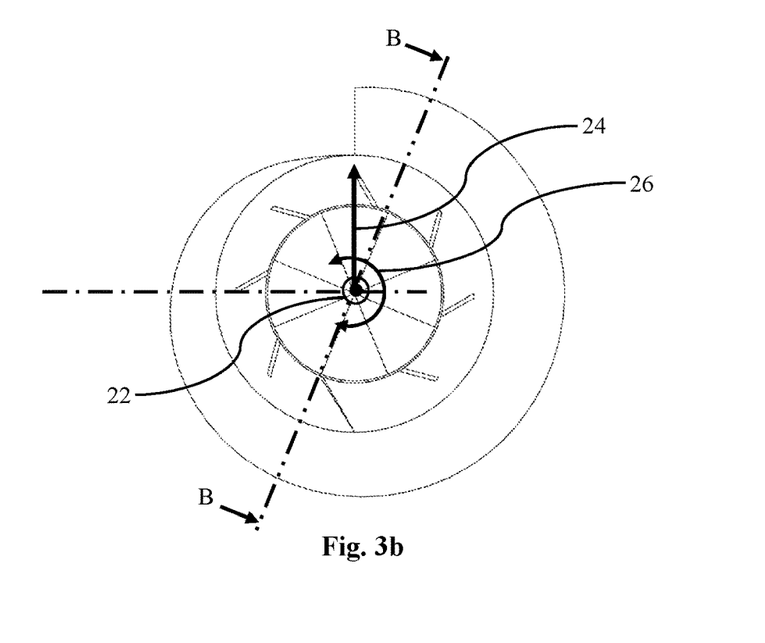

FIGS. 2a-2b and FIGS. 3a-3b each show a sectional side view and a corresponding top view of turbine 1, analogous to FIGS. 1a-1b; however in different positions of rotatable adjusting ring 30. It is thus clear that adjusting ring 30 is continuously adjustable by rotation about axis 22 between a first position (see FIGS. 1a-1b, 7a), and a second position (see FIGS. 3a-3b, 7c). Any positions between the first and second position may be realized by intermediate positions. This is depicted in FIGS. 2a-2b, 7b, which show, by way of example, an intermediate position in the middle between the first and second position. Overflow cross section 15 is thereby maximal in the first position and minimal in the second position (compare FIGS. 7a 7c). Overflow cross section 15 variably changes between the first position and the second position. For adjusting, adjusting ring 30 is rotated by an angle phi between the first position and the second position. For example, angle phi in the embodiment shown has a maximum value of 180°, which corresponds to an adjustment from the first into the second position. In the first position, adjusting ring 30 is not rotated and thus angle phi has a value of 0°. In the intermediate positions of the embodiment shown, angle phi may thus assume values between 0° and 180°, which lead with increasing values to achieving the maximum value at a continuous reduction of overflow cross section 15. The intermediate position of FIG. 2a-2b or of FIG. 7b shows an exemplary intermediate position at an angle phi=90°. Exceeding the maximum value of 180° would also be theoretically possible; however, in the embodiment shown, it would no longer lead to a reduction of overflow cross section 15. In alternative embodiments, angle phi may also have other maximum values between 0° and 360°. In these types of embodiments, for example at a maximum value of angle phi of 360°, angle phi may thus assume values between 0° and 360° in order to realize different intermediate positions with different overflow cross sections 15. Analogous to the above explanation, increasing values of angle phi, up to reaching the maximum value, lead to a continuous reduction of overflow cross section 15. For geometric reasons, however, an increase of angle phi leads again to an increase of overflow cross section 15 already shortly before reaching the maximum value of 360°, for example, at 350°. However, angle phi preferably has a maximum value between 90° and 270°. Correspondingly, intermediate positions with other values of phi, for example between 0° and 90° at a maximum value of 90°, or between 0 and 270° at a maximum value of 270°, may be realized. In some embodiments, the maximum value of angle phi may, however, also have a maximum value lower than 90° or a maximum value greater than 270°. An over rotation past the second position may be prevented by a limiting device, for example, a limiting element (not shown here). Due to the continuous adjustment, different overflow cross sections 15 between a maximum and minimum overflow cross section 15 may be realized. Thus, a more flexible turbine 1 may be provided which may be more efficiently adjusted to different operating states.

As is additionally clear in FIGS. 1a-3b, adjusting ring 30 comprises a plurality of guide vanes 40. Guide vanes 40 are arranged in flow channel 32 at a fixed guide angle 40a (see FIG. 2b). Guide vanes 40 may have a curved path, for example, a curved path in the flow direction. Expressed in other words, guide vanes 40 may have a curved path from radially outward to radially inward. In an embodiment of this type, guide vanes 40 each have an inflow angle and an exit angle (not shown) which are generally different from each other. If guide vanes 40 are arranged at a fixed guide angle 40a, then guide vanes 40 also have a fixed inflow angle and exit angle. The fluid flow thereby generally strikes initially at the inflow angle on respective guide vane 40, is guided along respective guide vane 40, and then leaves the guide vane region at the exit angle in order to strike turbine wheel 20. Due to fixed guide vanes 40, incidence losses may be reduced as turbine wheel 20 is always flowed over at a fixed angle of incidence. The blades of turbine wheel 20 may be correspondingly optimized with respect to the fixed angle of incidence. The efficiency of turbine 1 may be increased by this means. In alternative embodiments, guide angle 40a of guide vanes 40 may also be variably adjustable. The plurality of guide vanes 40 may also have different guide angles 40a. The shapes of the plurality of guide vanes 40 may also differ. Guide vanes 40 comprise a substitute blade 44 and a plurality of truncated guide vanes 42. Substitute blade 44 thereby extends in radial direction 24 up to a radially outer lateral face 33 of adjusting ring 30 (see, for example, FIG. 1b). Truncated guide vanes 42 are thereby spaced radially apart from radially outer lateral face 33. An incident flow on turbine wheel 1 may be improved by this means. A flow in flow channel 32, which flows in circumferential direction 26, may be deflected, for example, radially inward or radially outward by substitute blade 44. A continuing flow of the flow in circumferential direction 26 may thus be prevented. In contrast, a fluid flow in circumferential direction 26 may be facilitated by truncated guide vanes 42, at least in a region radially outside of truncated guide vanes 42. Due to this interplay between substitute blade 44 and truncated guide vanes 42, a flow inside of flow channel 32 in circumferential direction 26 may be controlled relative to adjusting ring 30.

Substitute blade 44 is thereby arranged in flow channel 32 in such a way that a radially outer region of substitute blade 44 connects to a radially inner wall 14a of a volute inlet 14, when adjusting ring 30 is located in the first position (see FIG. 1b). Due to this particularly advantageous embodiment, it may be prevented that substantial fluid amounts flow into adjusting ring 30 in a circumferential direction 26, opposite to a flow direction along periphery 26 determined by the volute geometry. This means, for example, in FIG. 1b, that a fluid flow, which flows clockwise through volute inlet 14 into volute 10, is prevented by substitute blade 44 from flowing counter-clockwise through flow channel 32 directly downstream from volute inlet 14.

Figure 4A:
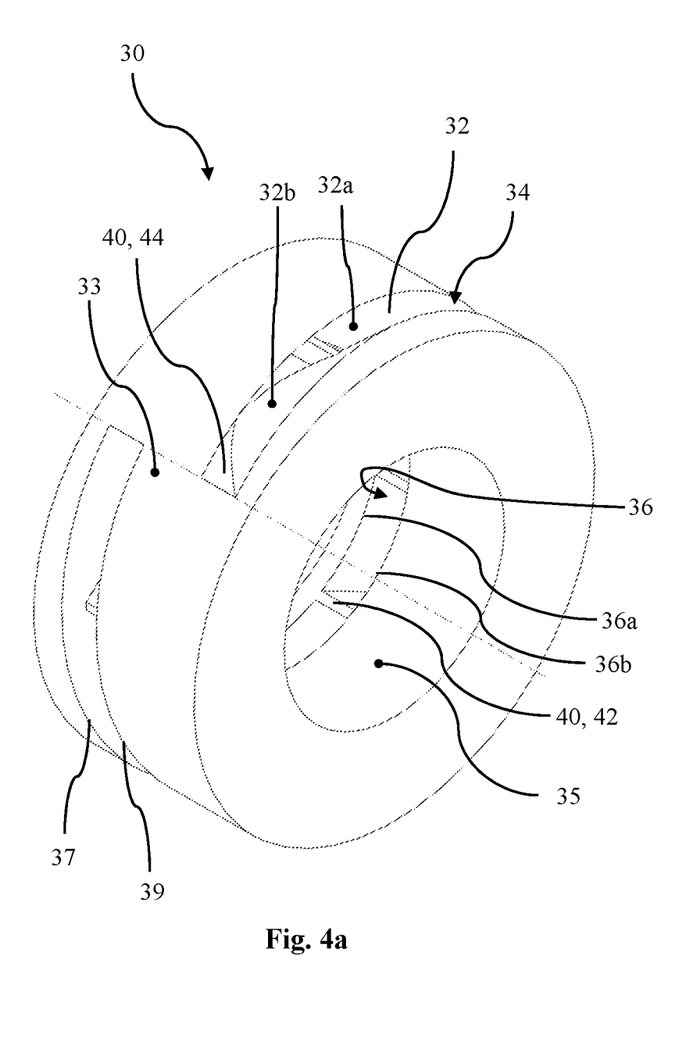
FIG. 4a shows the rotatable adjusting ring in an isometric view.
Figure 4B:
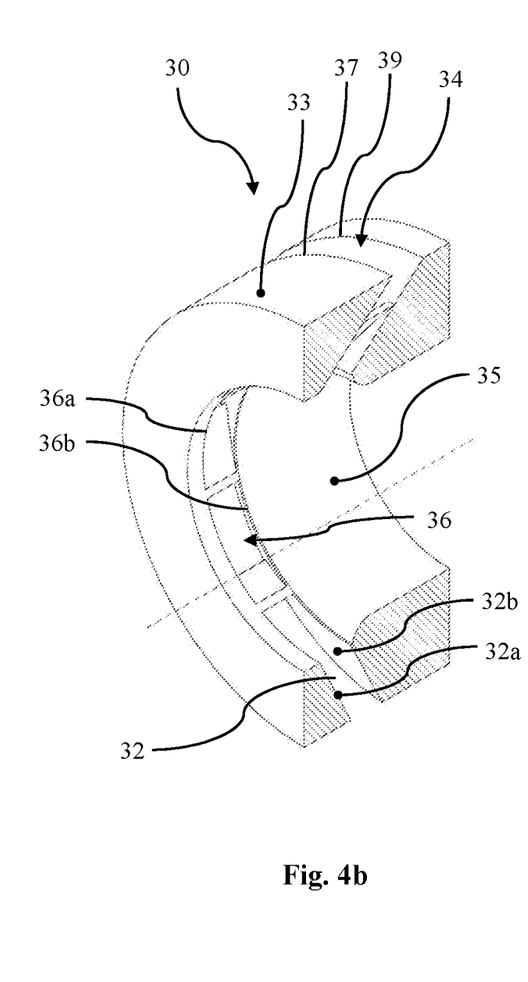
FIG. 4b shows the rotatable adjusting ring in an isometric sectional view.
Figure 5A:
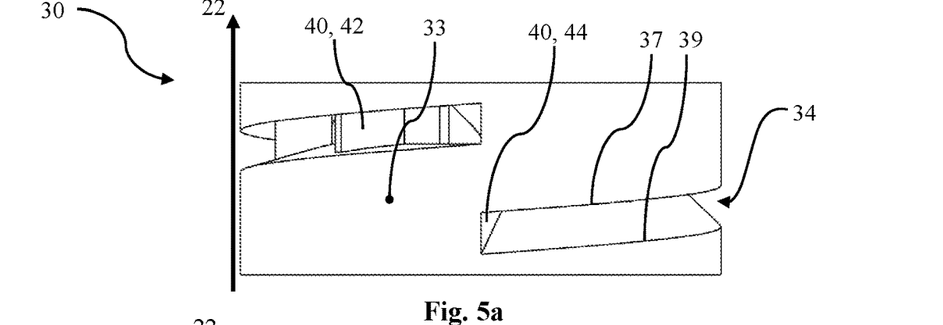
FIGS. 5a-5d show a side view of the rotatable adjusting ring in positions respectively rotated by 90° to each other.
Figure 5B:
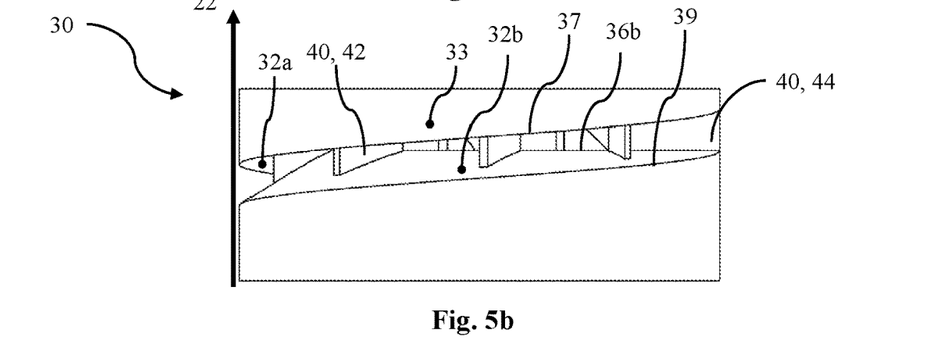
Figure 5C:
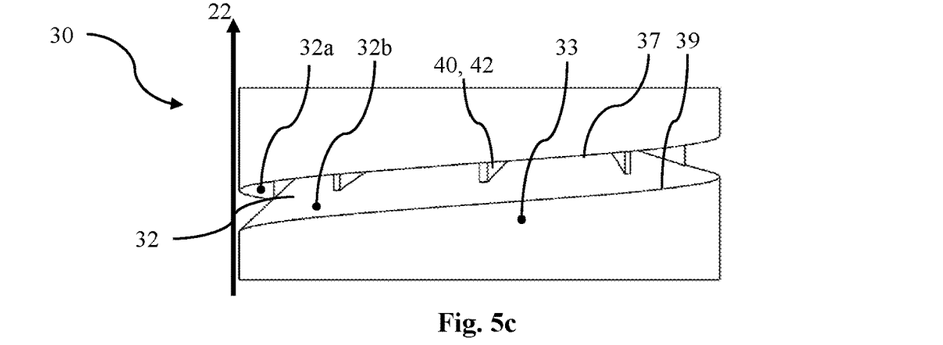
Figure 5D:
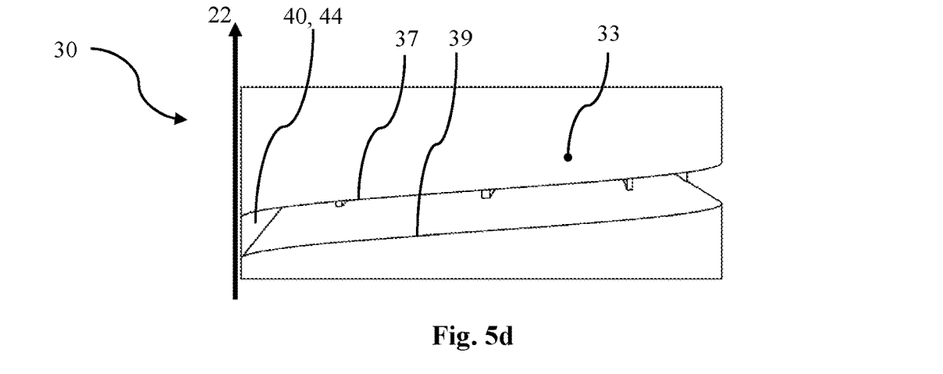

FIGS. 4a and 4b show isometric views of adjusting ring 30. Adjusting ring 30 has a radially outer lateral face 33 and a radially inner lateral face 35. First peripheral opening 34 is formed in radially outer lateral face 33 of adjusting ring 30. Second peripheral opening 36 is formed in radially inner lateral face 35 of adjusting ring 30. Flow channel 32 thereby extends from first peripheral opening 34 to second peripheral opening 36. This means that flow channel 32 penetrates adjusting ring 30 from first peripheral opening 34 to second peripheral opening 36 substantially in radial direction 34 (see also FIG. 1a).

Second peripheral opening 36 extends axially between a first surface line 36a and a second surface line 36b of radially inner lateral face 35 of adjusting ring 30 (see also FIGS. 4a-4b). First surface line 36a and second surface line 36b thereby extend along the entire periphery 26 along radially inner lateral face 35. In other words, this means that first surface line 36a and second surface line 36b extend over 360° in circumferential direction 26 on radially inner lateral face 35. In alternative embodiments, first surface line 36a and second surface line 36b also extend only along a majority of periphery 26 on radially inner lateral face 35, for example, across less than 360° in circumferential direction 26 on radially inner lateral face 35. Short interruptions of first surface line 36a and second surface line 36b in circumferential direction 26 are, for example, also possible. This may, for example, be caused by guide vanes 40 extending up to radially inner lateral face 35 (see truncated guide vanes 42 in FIG. 4b). Second peripheral opening 36 additionally has a constant axial height along periphery 26. This means that the axial spacing between first surface line 36a and second surface line 36b is constant over the entire path of second peripheral opening 36 in circumferential direction 26. Furthermore, second peripheral opening 36 may be arranged on radially inner lateral face 35 at a position axially constant with respect to turbine axis 22. In other words, this means that first surface line 36a and second surface line 36b each extend at a fixed axial position in circumferential direction 26.

First peripheral opening 34 extends axially between a first surface line 37 and a second surface line 39 of radially outer lateral face 33 of adjusting ring 30 (see also FIGS. 4a-4b). First surface line 37 and second surface line 39 thereby extend substantially along the entire periphery 26 along radially outer lateral face 33. In other words, this means that first surface line 37 and second surface line 39 extend over 360° in circumferential direction 26 of radially outer lateral face 33. In alternative embodiments, first surface line 37 and second surface line 39 may also extend only along a majority of periphery 26 on radially outer lateral face 33, for example, across less than 360° in circumferential direction 26 on radially outer lateral face 33. Short interruptions of first surface line 37 and second surface line 39 in circumferential direction 26 are, for example, also possible. This may, for example, be caused by guide vanes 40 extending up to radially outer lateral face 33 (see substitute blade 44 in FIG. 4b). First peripheral opening 34 is arranged on radially outer lateral face 33 along positions which axially differ with respect to turbine axis 22. In other words, this means that first surface line 37 and second surface line 39 each extend at different axial positions in circumferential direction 26. This means that first surface line 37 and second surface line 39 may indeed extend over 360° in circumferential direction 26 of radially outer lateral face 33; however, they travel in axial direction 22. Thus, first surface line 37 and second surface line 39 each have an axial jump or an axial interruption. Alternatively, first surface line 37 and second surface line 39 may also extend over different axial positions in circumferential direction 26 and not have an axial jump or an axial interruption.

Reference is made regarding this to FIGS. 5a-5d, which show adjusting ring 30 offset in each case by 90° from figure to figure. It is further clear, that first peripheral opening 34, with first surface line 37 and second surface line 39, changes its position in axial direction 22 across the periphery of radially outer lateral face 33. In contrast, second peripheral opening 36 (not completely visible in FIGS. 5a-5d) has a constant position in axial direction 22 across the periphery of radially inner lateral face 35. This is visible, for example, through horizontal, thus axially constant, second surface line 36b in FIG. 5b. The mentioned axial jump of first surface line 37 and second surface line 39 is also clear (see FIG. 5a).

Adjusting ring 30 has a first channel surface 32a, which extends between first surface line 36a on radially inner lateral face 35 and first surface line 37 on radially outer lateral face 33. Adjusting ring 30 additionally has a second channel surface 32b, which extends between second surface line 36b on radially inner lateral face 35 and second surface line 39 on radially outer lateral face 33 (see, for example, FIGS. 4a-4b and 5b-5c). Flow channel 32 is thereby formed between first channel surface 32a and second channel surface 32b. This means that flow channel 32 is delimited in radial direction 24 by first peripheral opening 34 and second peripheral opening 36 and in the axial direction by first channel surface 32a and second channel surface 32b.

In the sectional view of FIG. 4b, it is clear that first channel surface 32a extends straight between the two first surface lines 36a, 37. Likewise, second channel surface 32b extends straight between the two second surface lines 36b, 39. In alternative embodiments, first channel surface 32a may extend between the two first surface lines 36a, 37 and/or second channel surface 32b may extend between the two second surface lines 36b, 39 in a shape that is not straight, in particular in the shape of a curve, an arc, L-shaped or the shape of a spline.

An axial height of flow channel 32 is constant in radial path 24 from first peripheral opening 34 to second peripheral opening 36 (see FIG. 4b). In alternative embodiments, the axial height of flow channel 32 may be variable in radial path 24 from first peripheral opening 34 to second peripheral opening 36 (not shown). Furthermore, the axial height of flow channel 32 is constant along periphery 26. In alternative embodiments, the axial height of flow channel 32 may be variable along periphery 26 (not shown).

Figure 6:
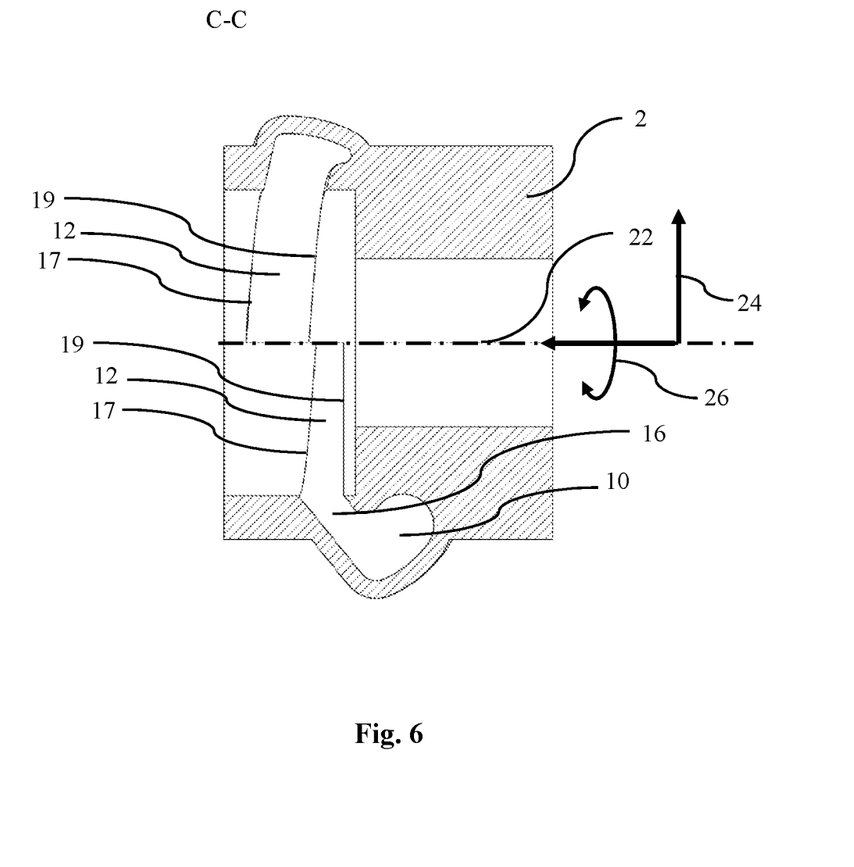
FIG. 6 shows a sectional side view of the turbine housing with volute.

FIG. 6 shows a sectional side view of turbine housing 2 according to sectional line C-C, as depicted in FIG. 1b. Turbine housing 2 and also volute 10 and outlet opening 12 are clear. Outlet opening 12 extends axially between a first contour line 17 and a second contour line 19 of volute 10. First contour line 17 and second contour line 19 thereby extend substantially along the entire periphery 26. In other words, this means that first contour line 17 and second contour line 19 extend across 360° in circumferential direction 26 of volute 10. In alternative embodiments, first contour lines 17 and second contour lines 19 may also extend only along a majority of periphery 26, for example, across less than 360° in circumferential direction 26. Short interruptions of first contour line 17 and second contour line 19 in circumferential direction 26 are, for example, also possible. This may be caused structurally, for example, by the volute terminating in the radially outer area of substitute blade 44 in FIG. 4b. Outlet opening 12 is arranged axially along different positions with respect to turbine axis 22. In other words, this means that first contour line 17 and second contour line 19 each extend at different axial positions in circumferential direction 26. This means that first contour line 17 and second contour line 19 may indeed extend across 360° in circumferential direction 26; however they thereby travel in axial direction 22. Thus, first contour line 17 and second contour line 19 each have an axial jump or an axial interruption. Alternatively, first contour line 17 and second contour line 19 may also extend over different axial positions in circumferential direction 26 and not have an axial jump or an axial interruption.

With reference to FIGS. 7a-7c, the configuration of outlet opening 12 and first peripheral opening 34 will now be explained in greater detail, and also how overflow cross section 15 changes during an adjustment of adjusting ring 30. As already mentioned, FIG. 7a shows the geometric relationships between outlet opening 12 and first peripheral opening 34 in the first, thus open position of adjusting ring 30. FIG. 7b analogously shows an intermediate position of the adjusting ring rotated by phi=90°, and FIG. 7c shows the second position of adjusting ring 30, in which adjusting ring 30 in the present embodiment is offset by phi=180°.

Surface lines 37, 39 and contour lines 17, 19 each comprise an axial starting position 17a, 19a, 37a, 39a and an axial end position 17b, 19b, 37b, 39b. Axial starting position 17a, 19a, 37a, 39a and axial end position 17b, 19b, 37b, 39b are indicated in FIG. 7a by horizontal dashed lines, which schematically depict the respective positions in axial direction 22. Each starting position 17a, 19a, 37a, 39a is thereby connected via a curve section 17c, 19c, 37c, 39c extending along periphery 26 to respective end position 17b, 19b, 37b, 39b. This means that surface lines 37, 39 and contour lines 17, 19 may each be defined via axial starting position 17a, 19a, 37a, 39a and axial end position 17b, 19b, 37b, 39b and a curve section 17c, 19c, 37c, 39c extending therebetween. Respective curve section 17c, 19c, 37c, 39c is thereby in particular a constant curve section. This enables a continuous change of overflow cross section 15. Curve sections 17c, 19c, 37c, 39c thereby extend essentially 360° along periphery 26.

An axial spacing 38 between the two surface lines 37, 39 is constant in circumferential direction 26. An axial spacing 18 between the two contour lines 17, 19 is variable in circumferential direction 26 in such a way that, during a rotation of adjusting ring 30, peripheral opening 34 is adjusted in relation to outlet opening 12 in order to variably change overflow cross section 15. This is clear from a comparison of FIGS. 7a-7ca.

In alternative embodiments, axial spacing 18 between the two contour lines 17, 19 may be substantially constant in circumferential direction 26. Axial spacing 38 may thereby also be constant. In alternative embodiments, axial spacing 18 between the two contour lines 17, 19 may be substantially constant in circumferential direction 26, and axial spacing 38 between the two surface lines 37, 39 may be variable in circumferential direction 26 in such a way that, during a rotation of adjusting ring 30, peripheral opening 34 is adjusted in relation to outlet opening 12 in order to variably change overflow cross section 15.

Axial starting positions 17a, 19a, 37a, 39a thereby each represent axial minimums of surface lines 37, 39 or contour lines 17, 19 respectively. Axial end positions 17b, 19b, 37b, 39b thereby each represent axial maximums of surface lines 37, 39 or contour lines 17, 19 respectively. In alternative embodiments, axial starting positions 17a, 19a, 37a, 39a may each also represent axial maximums and axial end positions 17b, 19b, 37b, 39b may each represent axial minimums.

As curve sections 17c, 19c, 37c, 39c essentially represent 360° along periphery 26, and starting and end positions 17a, 19a, 37a, 39a, 17b, 19b, 37b, 39b each represent axial maximums and minimums, surface lines 37, 39 and contour lines 17, 19 each have a discontinuous region between the two different axial positions 17a, 19a, 37a, 39a, 17b, 19b, 37b, 39b, in which surface lines 37, 39 and contour lines 17, 19 have a jump in axial direction 22.

As already mentioned, outlet opening 12 extends between first and second contour lines 17, 19 and first peripheral opening 34 extends axially between first and second surface lines 37, 39. Overflow cross section 15 thus results from the covering between outlet opening 12 and first peripheral opening 34 and is schematically represented in FIGS. 7a-7c by the square cross-hatched region. In FIG. 7a, first peripheral opening 34 is located completely within outlet opening 12. As peripheral opening 34 is smaller than outlet opening 12 in the exemplary embodiment, overflow cross section 15 is limited in each position by peripheral opening 34. Thus, overflow cross section 15 corresponds to the cross-sectional surface of peripheral opening 34 in the first position (see FIG. 7a). During a rotation of adjusting ring 30 by phi=90°, corresponding to FIG. 7b, a part of peripheral opening 34, here one-fourth of peripheral opening 34, travels out from the covering of outlet opening 12. This part of peripheral opening 34 is thereby covered in a flow-limiting way by turbine housing 2. Thus, overflow cross section 15 is reduced in comparison to that of FIG. 7a. Following therefrom, the flow speed of a fluid flowing through overflow cross section 15 may be increased. Additional intermediate positions at other angular positions phi and the states in the second position may be explained analogously.

As is particularly clear from FIG. 1a, volute 10 is inclined axially in such a way that an outflow channel 16 of volute 10 is aligned as flush with flow channel 32 in the first position of adjusting ring 30. Flow losses may be reduced by this means. Furthermore, turbine housing 2 may likewise be axial inclined. Turbine housing 2 may thus be separated in axial direction 22 in the region of volute 10 farther from a bearing housing of an exhaust gas turbocharger, which comprises a turbine 1 according to the invention, than a non-axially inclined turbine housing 2. Turbine 1 and the bearing housing may be better thermally decoupled by this means.

It should be understood that the present invention can also alternatively be defined in accordance with the following embodiments:

1. A turbine (1) comprising:
   a turbine housing (2) defining a volute (10) with a substantially annular outlet opening (12);
   a turbine wheel (20); and
   an adjusting ring (30), rotatable about the turbine axis (22), which is arranged in the turbine housing (2) radially between the volute (10) and the turbine wheel (20), wherein the adjusting ring (30) comprises a flow channel (32) between a radially outer first peripheral opening (34) and a radially inner second peripheral opening (36, and wherein the outlet opening (12) is fluidically coupled to the turbine wheel (20) by the flow channel (32),
   characterized in that
   the outlet opening (12) and the first peripheral opening (34) have a path, variable in axial direction (22), so that during a rotation of the adjusting ring (30), the outlet opening (12) and the first peripheral opening (34) are adjusted relative to each other in such a way that an overflow cross section (15) between the outlet opening (12) and the first peripheral opening (34) is variably changeable.
2. The turbine (1) according to Embodiment 1, characterized in that the adjusting ring (30) is continuously adjustable between a first position and a second position by means of rotation, wherein the overflow cross section (15) is maximal in the first position and minimal in the second position.
3. The turbine (1) according to Embodiment 2, characterized in that the adjusting ring (30) is rotated between the first position and the second position by an angle phi, wherein the angle phi preferably assumes a value between 90° and 270°, and particularly preferably a value of 180°.
4. The turbine (1) according to any one of the preceding Embodiments, characterized in that the adjusting ring (30) has a plurality of guide vanes (40) which are arranged in the flow channel (32).
5. The turbine (1) according to Embodiment 4, characterized in that the guide vanes (40) are arranged in the flow channel (32) at a fixed guide angle (40a).
6. The turbine (1) according to any one of Embodiments 4 or 5, characterized in that the plurality of guide vanes (40) comprises a substitute blade (44) and a plurality of truncated guide vanes (42), wherein the substitute blade (44) extends in the radial direction up to a radially outer lateral face (33) of the adjusting ring (30), and wherein the truncated guide vanes (42) are spaced radially apart from a radially outer lateral face (33).
7. The turbine (1) according to Embodiment 6 when dependent on Embodiment 2, characterized in that the substitute blade (44) is arranged in the flow channel (32) in such a way that a radially outer region of the substitute blade (44) connects to a radially inner wall (14a) of a volute inlet (14) when the adjusting ring (30) is located in the first position.
8. The turbine (1) according to any one of the preceding Embodiments, characterized in that the first peripheral opening (34) is formed in a radially outer lateral face (33) of the adjusting ring (30) and the second peripheral opening (36) is formed in a radially inner lateral face (35) of the adjusting ring (30).
9. The turbine (1) according to any one of the preceding Embodiments, characterized in that the flow channel (32) extends from the first peripheral opening (34) to the second peripheral opening (36).
10. The turbine (1) according to any one of the preceding Embodiments, characterized in that the second peripheral opening (36) has a constant axial height along the periphery (26).
11. The turbine (1) according to any one of the preceding Embodiments, characterized in that the second peripheral opening (36) is arranged on a radially inner lateral face (35) at an axially constant position relative to the turbine axis (22).
12. The turbine (1) according to any one of the preceding Embodiments, characterized in that the first peripheral opening (34) extends axially between a first surface line (37) and a second surface line (39) of a radially outer lateral face (33) of the adjusting ring (30), wherein the first surface line (37) and the second surface line (39) extend substantially along the entire periphery (26).
13. The turbine (1) according to any one of the preceding Embodiments, characterized in that the outlet opening (12) extends axially between a first contour line (17) and a second contour line (19) of the volute (10), wherein the first contour line (17) and the second contour line (19) extend substantially along the entire periphery (26).
14. The turbine (1) according to Embodiments 12 and 13, characterized in that the surface lines (37, 39) and the contour lines (17, 19) each comprise an axial starting position (17a, 19a, 37a, 39a) and an axial end position (17b, 19b, 37b, 39b), wherein the respective starting position (17a, 19a, 37a, 39a) is connected to the respective end position (17b, 19b, 37b, 39b) via a curve section (17c, 19c, 37c, 39c), in particular a constant curve section (17c, 19c, 37c, 39c), extending along the periphery (26).
15. The turbine (1) according to Embodiment 14, characterized in that the axial starting positions (17a, 19a, 37a, 39a) and the axial end positions (17b, 19b, 37b, 39b) each depict axial maximums and axial minimums of the surface lines (37, 39) or of the contour lines (17, 19).
16. The turbine (1) according to any one of Embodiments 14 or 15, characterized in that the curve sections (17c, 19c, 37c, 39c) extend substantially 360° along the periphery, so that surface lines (37, 39) and contour lines (17, 19) each additionally have a discontinuous area between the two different axial positions (17a, 17b; 19a, 19b; 37a, 37b; 39a, 39b), in which the surface lines (37, 39) and the contour lines (17, 19) have a jump in the axial direction.

17. The turbine (1) according to any one of the preceding Embodiments when dependent on Embodiments 12 and 13, characterized in that either an axial spacing (38) between the two surface lines (37, 39) or an axial spacing (18) between the two contour lines (17, 19) is substantially constant in the circumferential direction (26), and that the respectively other axial spacing (18, 38) is variable in such a way that the peripheral opening (34) is adjusted with respect to the outlet opening (12) during a rotation of the adjusting ring (30) in order to variably change the overflow cross section (15).

18. The turbine (1) according to any one of the preceding Embodiments, characterized in that an axial height of the flow channel (32) is constant in the radial path from the first peripheral opening (34) to the second peripheral opening (36).

19. The turbine (1) according to any one of the preceding Embodiments, characterized in that an axial height of the flow channel (32) is constant along the periphery (26).

20. The turbine (1) according to any one of the preceding Embodiments, characterized in that the second peripheral opening (36) extends axially between a first surface line (36a) and a second surface line (36b) of a radially inner lateral face (35) of the adjusting ring (30), wherein the first surface line (36a) and the second surface line (36b) extend along the entire periphery (26).

21. The turbine (1) according to Embodiment 20 when dependent on Embodiment 12, characterized in that the flow channel (32) is formed between a first channel surface (32a), which extends between the two first surface lines (36a, 37), and a second channel surface (32b), which extends between the two second surface lines (36b, 39).

22. The turbine (1) according to Embodiment 21, characterized in that the first channel surface (32a) extends straight between the two first surface lines (36a, 37) and that the second channel surface (32b) extends straight between the two second surface lines (36b, 39).

23. The turbine (1) according to any one of the preceding Embodiments, characterized in that the volute (10) is axially inclined in such a way that an outflow channel (16) of the volute (10) is aligned as flush with the flow channel (32) in the first position of the adjusting ring (30).

24. An exhaust gas turbocharger comprising:
a compressor;
a turbine, wherein the compressor and the turbine are mounted on a mutual shaft and are torsionally coupled to each other,
characterized in that the turbine is a turbine (1) according to any one of preceding Embodiments 1 through 23.

25. The exhaust gas turbocharger according to Embodiment 24, further comprising a bearing housing which is arranged axially between the compressor and the turbine (1) characterized in that the turbine housing (2) is inclined axially away from the bearing housing in the area of volute (10).

The invention claimed is:

1. A turbine (1) comprising:
a turbine housing (2) defining a volute (10) with a substantially annular outlet opening (12);
a turbine wheel (20); and
an adjusting ring (30), rotatable about the turbine axis (22), which is arranged in the turbine housing (2) radially between the volute (10) and the turbine wheel (20), wherein the adjusting ring (30) comprises a flow channel (32) between a radially outer first peripheral opening (34) and a radially inner second peripheral opening (36, and wherein the outlet opening (12) is fluidically coupled to the turbine wheel (20) by the flow channel (32), characterized in that
the outlet opening (12) and the first peripheral opening (34) have a path, variable in axial direction (22), so that during a rotation of the adjusting ring (30), the outlet opening (12) and the first peripheral opening (34) are adjusted relative to each other in such a way that an overflow cross section (15) between the outlet opening (12) and the first peripheral opening (34) is variably changeable.

2. The turbine (1) according to claim 1, characterized in that the adjusting ring (30) is continuously adjustable between a first position and a second position by means of rotation, wherein the overflow cross section (15) is maximal in the first position and minimal in the second position.

3. The turbine (1) according to claim 2, characterized in that the adjusting ring (30) is rotated between the first position and the second position by an angle phi, wherein the angle phi preferably assumes a value between 90° and 270°, and particularly preferably a value of 180°.

4. The turbine (1) according to claim 1, characterized in that the adjusting ring (30) has a plurality of guide vanes (40) which are arranged in the flow channel (32).

5. The turbine (1) according to claim 4, characterized in that the plurality of guide vanes (40) comprises a substitute blade (44) and a plurality of truncated guide vanes (42), wherein the substitute blade (44) extends in the radial direction up to a radially outer lateral face (33) of the adjusting ring (30), and wherein the truncated guide vanes (42) are spaced radially apart from a radially outer lateral face (33) and optionally wherein the substitute blade (44) is arranged in the flow channel (32) in such a way that a radially outer region of the substitute blade (44) connects to a radially inner wall (14a) of a volute inlet (14) when the adjusting ring (30) is located in the first position.

6. The turbine (1) according to claim 1, characterized in that the first peripheral opening (34) is formed in a radially outer lateral face (33) of the adjusting ring (30) and the second peripheral opening (36) is formed in a radially inner lateral face (35) of the adjusting ring (30).

7. The turbine (1) according to claim 1, characterized in that the second peripheral opening (36) has a constant axial height along the periphery (26).

8. The turbine (1) according to claim 1, characterized in that the second peripheral opening (36) is arranged on a radially inner lateral face (35) at an axially constant position relative to the turbine axis (22).

9. The turbine (1) according to claim 1, characterized in that the first peripheral opening (34) extends axially between a first surface line (37) and a second surface line (39) of a radially outer lateral face (33) of the adjusting ring (30), wherein the first surface line (37) and the second surface line (39) extend along the entire periphery (26).

10. The turbine (1) according to claim 9, characterized in that the outlet opening (12) extends axially between a first contour line (17) and a second contour line (19) of the volute (10), wherein the first contour line (17) and the second contour line (19) extend along the entire periphery (26).

11. The turbine (1) according to claim 10, characterized in that the surface lines (37, 39) and the contour lines (17, 19) each comprise an axial starting position (17a, 19a, 37a, 39a) and an axial end position (17b, 19b, 37b, 39b), wherein the respective starting position (17*a*, 19*a*, 37*a*, 39*a*) is connected to the respective end position (17*b*, 19*b*, 37*b*, 39*b*) via a curve section (17*c*, 19*c*, 37*c*, 39*c*), in particular a constant curve section (17*c*, 19*c*, 37*c*, 39*c*), extending along the periphery (26).

12. The turbine (1) according to claim 10, characterized in that either an axial spacing (38) between the two surface lines (37, 39) or an axial spacing (18) between the two contour lines (17, 19) is constant in the circumferential direction (26), and that the respectively other axial spacing (18, 38) is variable in such a way that the peripheral opening (34) is adjusted with respect to the outlet opening (12) during a rotation of the adjusting ring (30) in order to variably change the overflow cross section (15).

13. The turbine (1) according to claim 1, characterized in that the volute (10) is axially inclined in such a way that an outflow channel (16) of the volute (10) is aligned as flush with the flow channel (32) in the first position of the adjusting ring (30).

14. An exhaust gas turbocharger comprising:
- a compressor;
- a turbine, wherein the compressor and the turbine are mounted on a mutual shaft and are torsionally coupled to each other,
- characterized in that the turbine is a turbine (1) according to claim 1.

15. The exhaust gas turbocharger according to claim 14, further comprising a bearing housing which is arranged axially between the compressor and the turbine (1) characterized in that the turbine housing (2) is inclined axially away from the bearing housing in the area of volute (10).

\* \* \* \* \*